Figure 1:
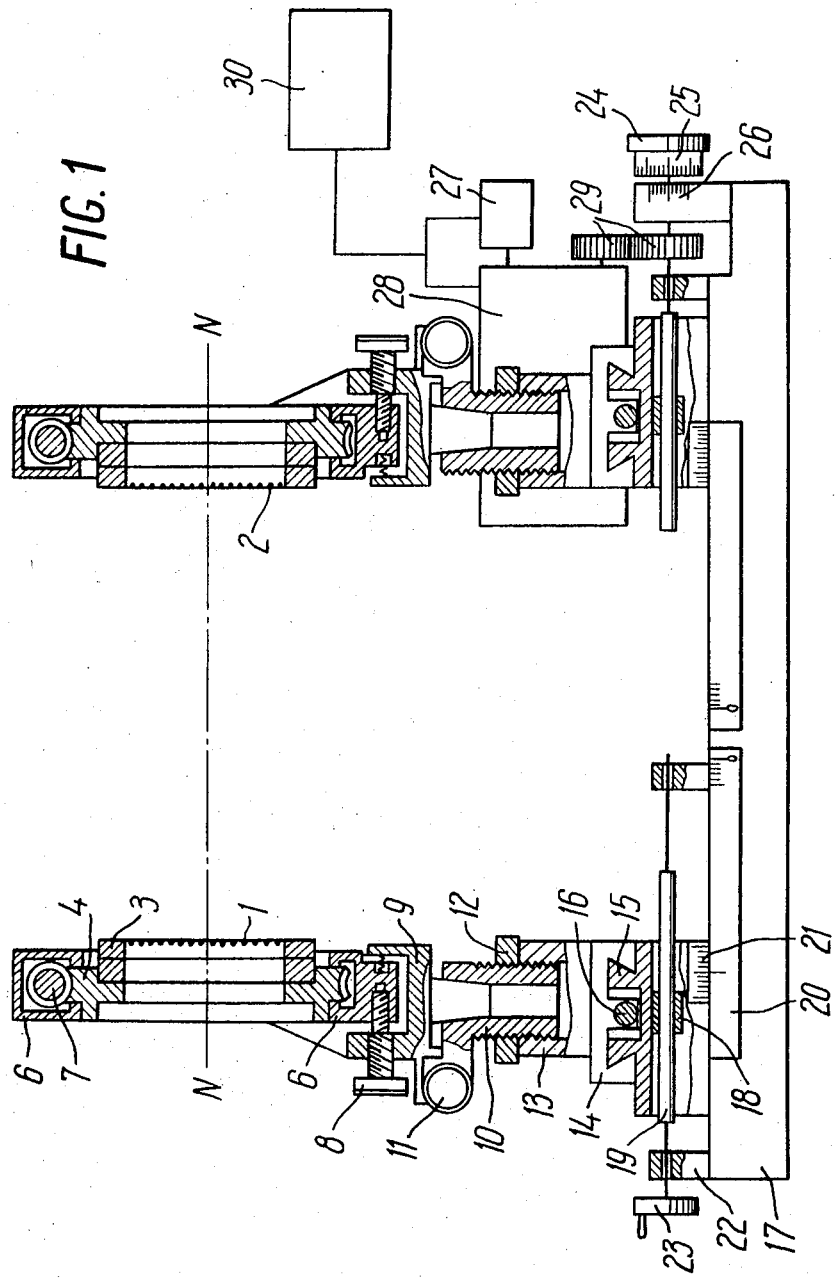

United States Patent
Bulygin et al.

[11] 3,728,640
[45] Apr. 17, 1973

[54] OPEN-TYPE RESONATOR

[76] Inventors: Nikolai Vladimirovich Bulygin, B. Cherkizovskaya, kvartal 8-11, korpus 21, kv. 60; Evgeny Alexandrovich Vinogradov, Kozhevnicheskaya ulitsa, 1b, kv. 33; Lev Genrikhovich Gugel, ulitsa Medvedeva, 14, kv. 33; Evgeny Mikhailovich Dianov, Michurinsky prospekt, 12, korpus 1, kv. 47; Natalia Alexandrovna Irisova, ulitsa Vavilova, 44, korpus 3, kv. 74, all of Moscow, U.S.S.R.

[22] Filed: Mar. 29, 1972

[21] Appl. No.: 239,169

[52] U.S. Cl. ................................331/94.5, 356/112
[51] Int. Cl. ............................................H01s 3/08
[58] Field of Search ...................331/94.5; 356/112

[56] References Cited
UNITED STATES PATENTS

| | | | |
|---|---|---|---|
| 3,225,307 | 12/1965 | Weissman | 331/94.5 |
| 3,359,812 | 12/1967 | Everitt | 331/94.5 |
| 3,400,597 | 9/1968 | Nater | 331/94.5 |

*Primary Examiner*—William L. Sikes
*Attorney*—Eric H. Waters

[57] ABSTRACT

An open-type resonator, substantially, for quasi optical channels, formed by two reflectors which by means of permanent magnets are secured on adjusting devices mounted on movable supports. The supports themselves are mounted on guides with a possibility of movement with the aid of micrometer screws, the micrometer screw of the rear reflector can be rotated either manually or with an electric motor through a speed reducer having a variable reduction ratio, while the use of the guides provides for displacement of the reflectors through distances which considerably overcome the operating wavelength.

1 Claim, 2 Drawing Figures

OPEN-TYPE RESONATOR

The present invention relates to resonators and, more specifically, to open-type resonators for quasi-optical channels which are suitable for use within a wide range of wavelengths as a wavemeter, an interference filter with a variable Q-factor and for testing dielectric characteristics of specimens of various substances, etc.

Known in the prior art are Fabry-Perot interferometers for quasi-optical channels.

The reflectors of such a resonator comprise two-dimensional metallic arrays one of which is capable of moving along the optical axis of the interferometer with the aid of a micrometer screw. The reflectors are provided with adjusting screws which are used for bringing the reflectors in perpendicular alignment with the optical axis of the instrument.

However, these open-type resonators suffer from serious disadvantages.

In the first place, the reflector of the resonator can be moved through only a small distance. As a result the resonator is operable only at low orders of interference, particularly, within the range of millimetre waves.

Secondly, continuous tuning of the resonator (at a constant wavelength) cannot be effected within a wide range of variations of the Q-factor.

Thirdly, none of the reflectors can be replaced with a solid mirror, viz. spherical, and this does not allow one to obtain high Q-factors. Moreover, replacement of the array reflectors presents a problem, the construction of the instrument does not permit the operator to place specimens of substances inside the resonator for measuring such important characteristics as transparency of the specimens and the phase shift introduced thereby. In addition, the micrometer screw moving the reflector is manually actuated whereby the measuring procedure cannot be automated while the experimentator is run into the danger of undesired high-frequency irradiation.

An object of the present invention is aimed at providing an open-type resonator permitting specimens of solid dielectric materials to be tested within a wide frequency range and within a wide range of variations of the Q-factor of the resonator providing a possibility of automatically recording the measuring data and high efficiency of the operation.

This object is attained due to the fact that in an open-type resonator formed by at least two reflectors mounted in holders arranged in adjustable frames mounted on supports, one of which is adapted to move along the optical axis of the device by means of a micrometer screw, according to the invention, the reflectors whose holders are made of a ferromagnetic material, are mounted in rotary rings by means of permanent magnets secured on these rings, and said rotary rings, in turn, are mounted in the adjustable frames with a possibility of rotation about the optical axis, said frames being arranged on said supports which are mounted on guides, whereas the second support is also provided with a micrometer screw; the micrometer screw of one of the supports being coupled with a motor through a reducer with a variable reduction ratio.

Figure 2:
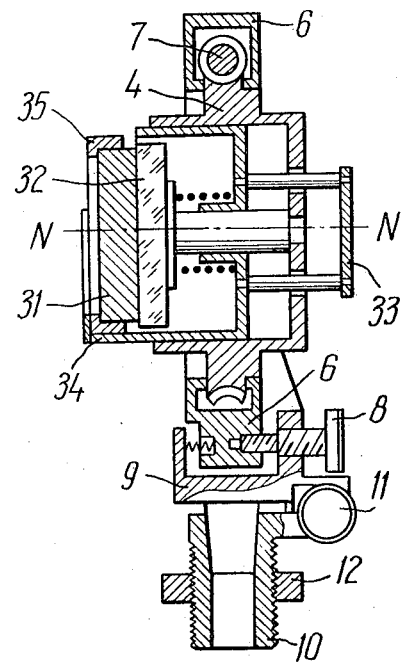

The invention will be better understood from the following detailed description of a particular embodiment of the invention with reference to the accompanying drawings, in which:

FIG. 1 is a longitudinal section of the open-type resonator for quasi-optical channels, according to the invention; and FIG. 2 is a longitudinal section of the head with a solid reflector, of the proposed resonator according to the invention.

An open-type resonator (FIG. 1) comprises two reflectors: a front reflector 1 and a rear reflector 2. An array element is employed as the front reflector 1. The rear reflector 2 may be constituted both by an array element and by a solid convex or concave mirror, viz., a spherical mirror. This fact makes it possible to increase the Q-factor of the resonator due to the reduction of the difraction losses.

The array element is a holder 3, for example, a ring holder with current conductors stretched parallel to one another.

The holders 3 are made of ferromagnetic material. In order to reduce the difraction losses, the diameter of the holder 3 is chosen to exceed the maximum wavelength of the selected band.

The higher the ratio of the diameter of the holder 3 to the wavelength, the higher Q-factor of the resonator can be obtained.

To reduce the losses associated with the resistance of the array element conductors and to increase the Q-factor and the amplitude of the resonance oscillations the conductors must preferably be made of a high-conductance material or be provided with a coating of such a material. In the latter case the thickness of the layer of the coating should be at least equal to that of the skin-layer in the selected band.

The distance between the conductors must be less than the minimum wavelength of the selected range.

The higher the ratio $\lambda/l$ and $\alpha/l$ (where $\lambda$ is the wavelength, $l$ is the distance between the conductors and $\alpha$ is the width of the conductor in the holder plane), the higher the Q-factor of the resonator. However, this holds true until the losses associated with the resistance of the conductors became predominant.

The reflectors 1 and 2 with their holders 3 are mounted on rotary rings 4 by means of permanent magnets 5 secured on the same rings.

The rotary rings 4 are mounted in adjustable frames 6 and equipped with worm gears 7. The adjustable frames 6 are provided with adjusting screws 8 and located in housings 9. The housings 9 are connected to bases 10 which are provided with adjusting screws 11 and union nuts 12. The position of these nuts determines the displacement of the reflectors 1 and 2 relative to the optical axis NN, while the adjusting screws 8 and 11 provide for a possibility of setting the reflectors 1 and 2 normal to the optical axis NN.

The entire assembly comprising the reflector 1 or 2, the rotary ring 4, the adjustable frame 6, the housing 9, and the base 10 forms a detachable head which is mounted on the support through the base 10.

The supports include bushings 13, platforms 14, and carriages 15. The upper portions of the carriages 15 are made as transverse guides carrying the platforms 14. The latter are coupled to the carriages 15 through adjusting screws 16. The position of these screws determines that of the reflectors 1 and 2 in a transverse direction relative to the optical axis NN.

The carriages 15 themselves are mounted on guides 17. The guides 17 are made of an optical bench or another device providing for smooth linear motion of the carriages 15.

Secured in the lower portions of the carriages 15 are split nuts 18 providing for a play-free joint of the carriages 15 with the micrometer screws 19.

The guides 17 and the carriages 15 are provided with reading devices viz., scales 20 secured on the guides 17 and noniuses 21 secured on the carriages 15. These reading devices provide for rough measurement of the displacement of the reflectors 1 and 2.

The micrometer screws 19 are mounted in bearings 22 fixed on the guides 17. The micrometer screw 19 of the support of the front reflector 1 is terminated in a crank handle 23. The micrometer screw 19 of the support of the rear reflector 2 is terminated in a knob 24. The knob 24 is provided with a dial 25 matched with a vernier 26 secured on the guides 17 and used for accurately reading the magnitude of displacement of the reflector 2 along the guides 17. In addition, the micrometer screw 19 of the support of the rear reflector 2 is coupled to an electric motor 27 through a speed reducer 28 and a gearing 29. The gear ratio of the reducer 28 can be varied several magnitudes.

The control of the motor 27 and the change of the gear ratio of the reducer 28 are effected from a remote control console 30.

The open-type resonator is provided with an additional detachable head (FIG. 2) for testing specimens of solid dielectrics.

This head differs from the above-described head in that a flat mirror 32 is used as a rear reflector 2. Besides, the head is provided with a spring-loaded clamp 33 with a locator pin 34 adapted to fix the specimens 31 to be tested as close as possible to the reflector 32. The interchangeable rings 35 mounted in the locator 34 make it possible to test the specimens 31 of different diameters.

When equipped with additional accessories, the device can be used for studying liquid and gaseous substances.

The device operates as follows.

The electromagnetic radiation from a source (not shown) is shaped into a flat-parallel beam and is directed parallel to the guides 17 of the resonator. By means of the nuts 12 and the screw drives 16 the optical axis NN of the resonator coincides with the axis of the beam of electromagnetic radiation. In this case the reflectors 1 and 2 by means of the worm gears 7 are set so that the conductors forming these reflectors (in case of using array elements) are parallel to the electric vector E of the radiation incidenting on these elements.

By means of the adjusting screws 8 and 11, the planes of the radiators are set normal to the radiation incident thereupon. In this case, a portion of the flow of the electromagnetic energy incident upon the reflector 1 is reflected therefrom, while another portion penetrates into the resonator and emerges from it through the reflector 2.

The adjustment of the reflectors is effected by the maximum transmission of the radiation through the resonator corresponding to the maximum Q-factor of the resonator.

The resonator transmission is maximum when the resonator is tuned in resonance with the frequency of the radiation incident upon the resonator.

By way of selecting the parameters of the reflectors and the distance therebetween, the transmission factor close to unity within a wide frequency range (a few octaves) may be attained.

The Q-factor of the resonator can be varied continuously by rotating one of the reflectors 1, 2 by means of the worm gear 7 so as to change the angle between the conductors of the front 1 and rear 2 reflectors (array elements).

Increasing the distance between the reflectors 1 and 2, it is possible to ensure higher orders of interference corresponding to higher values of the Q-factor.

The selection of the order of interference is effected by displacing the reflector.

It is well known that the Q-factor of a resonator at a fixed frequency of radiation is determined by the formula:

$$Q = L/\Delta L,$$

where L is the distance between the reflectors corresponding to the resonance at an adopted order of interference:

L is the displacement of the reflector corresponding to the width of the resonance curve at a level 0.5 of the maximum transmitted power.

The measurement of the Q-factor is conveniently made with the automatic recording of the resonance curves by means of any recording instrument. In this case, the reflector 2 should be uniformly shifted along the optical axis NN of the resonator by means of the micrometer screw 19 driven by the electric motor 27 through the reducer 28 and the worm gear 29. The velocity of travel of the reflector 2 is selected depending upon the required scale of recording of the resonance curves. In this case the magntides proportional to L and $\Delta L$ can be measured with a sufficient accuracy on the recorded curves with the aid of a scale.

When the resonator is employed as a wavemeter, one of the reflectors 1, 2 is displaced so as to tune the resonator in resonance with the radiation frequency, and the position of the reflector 2 is read off the scale 20 and the dial 25. Then the rear reflector 2 is moved either manually or by means of the electric motor 27 until the resonator falls in resonance in the next order of interference, and the new position of the resonator 2 is read-off. The distance for which the reflector 2 has been displaced, will be equal to a half-wave of the raidation.

The accuracy of measurement of wavelengths may be considerably increased if the rear reflector 2 is displaced not for one but for a few orders of interference.

The resonator can be used as an interference filter within a wide range of wavelengths and Q-factors.

The resonator is particularly suitable for determining the transmission factors of the phase shift of specimens of solid dielectrics. It is expedient for testing the specimens having a power transmission factor exceeding 60 percent.

For this purpose, a flat specimen is either pressed to the flat solid rear reflector (FIG. 2) or is moved within the resonator in a special frame.

By measuring the Q-factor of the resonator it is possible to calculate the losses introduced by the specimen and, therefore, the absorption coefficient of the specimen. Thus, it is possible to test the specimens with a relative absorption coefficient below $10^{-4}$. By measuring the shift of the resonance frequency of the resonator or the displacement of one of the reflectors necessary for restoring the resonance after placing the testing specimen into the resonator, it is possible to determine the angle of phase shift introduced by this specimen and the index of refraction of the specimen being tested.

The herein disclosed resonator provides for making tests within a wide frequency range. It is particularly efficient for wavelengths from 200 mm to 4 mm. The instrument can operate at very high orders of interference of a few hundreds.

The maximum magnitude of the Q-factor of the resonator may exceed $10^5$.

The reproducibility of measurement of a wavelength is $10^{-5}$.

The resonator makes it possible to test specimens of substances with absorption coefficients to magnitudes less than $10^{-4}$.

The resonator provides for the measurement of refraction coefficients of testing specimens with an error less than 1 percent.

The resonator equipped with additional devices can be used for testing specimens of liquid and gaseous substances.

We claim:

1. An open-type resonator comprising: at least two reflectors fixed in holders made of ferromagnetic material, rotary rings, permanent magnets mounted in said rings and securing said ferromagnetic holders in said rotary rings, adjustable frames accommodating said rotary rings with a possibility of rotation about the optical axis, supports carrying said adjustable frames, micrometer screws provided on said supports, guides on which said supports, are mounted; a speed reducer having a variable reduction ratio connected to said micrometer screw, a motor coupled to said speed reducer and capable of displacing one of the reflectors.

* * * * *